United States Patent [19]
Dossot et al.

[11] Patent Number: 5,621,287
[45] Date of Patent: Apr. 15, 1997

[54] FLEXIBLE AUXILIARY DEFLECTION COIL

[75] Inventors: Alain Dossot, Chevigny-Saint-Sauveur; Jean-Philippe Descombes, Premieres, both of France

[73] Assignee: Thomson Tubes & Displays S.A., France

[21] Appl. No.: 583,253

[22] Filed: Jan. 5, 1996

Related U.S. Application Data

[63] Continuation of Ser. No. 224,597, Apr. 7, 1994, abandoned.

[30] Foreign Application Priority Data

Apr. 21, 1993 [EP] European Pat. Off. ............... 93401031

[51] Int. Cl.$^6$ ................................ G09G 1/04; H04N 5/21
[52] U.S. Cl. ........................... 315/399; 315/370; 348/626
[58] Field of Search ................................ 315/399, 370; 348/626

[56] References Cited

U.S. PATENT DOCUMENTS

| | | | |
|---|---|---|---|
| 3,702,450 | 11/1972 | Avery et al. | 335/213 |
| 4,261,014 | 4/1981 | Lee | 348/626 |
| 4,313,152 | 1/1982 | Vranken | 336/200 |
| 5,179,320 | 1/1993 | Tripod | 315/399 |

FOREIGN PATENT DOCUMENTS

| | | |
|---|---|---|
| 0151039 | 8/1985 | European Pat. Off. . |
| 60-39743 | 1/1985 | Japan . |

OTHER PUBLICATIONS

Haenan et al "Scan Velocity Modulation Increases TV Picture Sharpness", Elec. Comp. & Applic. vol. 4, No. 1 Nov. 1981.

Scan Velocity Modulation Increases TV Picture Sharpness. Author G. Haenen, H. Simons. Electronic Components & Applications vol. 4 No. 1 Nov. 1981.

A Method of Improving the Quality of a Television Picture By Means of Beam Scan Velocity Modulation, E. Rutishauser, RCA Zurich Labs, Report No. MRZ-244 Dec. 14, 1978.

Fujitsu General TV Receiver Model BS-29M55H, Tube Neck Mounted SVM Driver, With SVM Coil and Magnet Assembly Part No. VM988-3 Photographs of Complete Assembly & Wound SVM Coil.

Toshiba TV Receiver Model 21G-D80 Tube Neck Mounted SVM Driver, With SVM Coil and Magnet Assembly. Photograps of Complete Assembly & Single Sided Flexible SVM Coil.

*Primary Examiner*—Gregory C. Issing
*Attorney, Agent, or Firm*—Joseph S. Tripoli; Joseph J. Laks; Francis A. Davenport

[57] ABSTRACT

A cathode ray tube display with scanning beam velocity modulation comprises a cathode ray tube with a neck and gun for generating an electron beam. A deflection yoke is mounted on the cathode ray tube for electron beam deflection. A first flexible support having a side for conductor fabrication and a second flexible support having a side for conductor fabrication are superimposed and wrapped to conform to the neck circumference. A first coil pattern is formed as a conductor on the first conductor fabrication side and a second coil pattern is formed as a conductor on the second conductor fabrication side. A conductive connection couples between the first coil pattern and the second coil pattern. A connector couples scanning velocity modulation current to energize said first coil pattern and said second coil pattern for scanning beam velocity modulation.

6 Claims, 4 Drawing Sheets

FLEXIBLE AUXILIARY DEFLECTION COIL

This is a continuation of application Ser. No. 08/224,597, filed Apr. 7, 1994, now abandoned.

This invention relates to the field of beam scan velocity modulation apparatus for cathode ray tube displays, and in particular to a flexible conductor auxiliary deflection coil.

BACKGROUND OF THE INVENTION

Scan velocity modulation is known in beam deflection of cathode ray tubes, and is employed to enhance the perceived sharpness of the displayed picture. The basic concept of scan velocity modulation is the modulation of the horizontal scanning velocity of the electron beam at a light to dark or dark to light image transitions. For example, when a scan crosses a bright vertical bar on a dark background, the objective is a display where the screen brightness rises instantly to a maximum as the horizontal scan crosses the bright vertical bar and then drops instantly to the minimum level after passing the bar. However, the rise and fall times of the electron beam current are not instantaneous. In a display without scan velocity modulation, there are shades of gray at the transitions which blur the edges and are perceived as a softening, or lack of sharpness.

With beam scan velocity modulation, circuitry is provided to anticipate a transition in the luminance signal, and to modify the horizontal scanning speed such that the beam is accelerated at the dark area adjacent the transition, i.e., scanned at a rate in excess of the average scan rate. The time gained by this acceleration of the beam is used on the bright side of the transition, where the beam is decelerated to below the average scanning rate, thus the total time taken to scan horizontal lines remains constant, with the acceleration and deceleration canceling one another. The effect of increasing the scanning beam velocity in the dark area prior to the bright transition results in less beam current hitting the phosphor and consequently less phosphor excitation which makes the dark area darker. The slowed scanning velocity in the bright area causes the beam to excite the phosphors for a slightly longer period and results in an additional brightening immediately after the transition. The overall effect of the velocity modulation at an edge transition is to cause the transition to appear sharper than if scanned at a constant rate. At transitions from a light background to a dark area the process is reversed. The net effect is to increase the perceived sharpness of image edges, and thus the picture appears to be sharper and of greater resolution.

The beam velocity modulation is applied using an additional coil operable to modify the horizontal deflection of the beam. The additional coil is driven with edge transition information extracted from the luminance video signal by a driver circuit.

The SVM coil may be a flat wound laminated coil, which in some earlier SVM applications was mounted on the purity/static convergence magnet holder, to affect the electron beams after they exit the focus (G4) grid of the electron gun. Printed circuit coils are also known and these may be positioned under the static convergence magnets or under the deflection yoke.

SVM coil placement in the immediate proximity of the electron guns reduces the SVM coil field strength applied to the electron beam. The electron guns normally include permeable ferromagnetic material (e.g., steel) which tends to confine the SVM field to the permeable material. The electron guns also include non-ferromagnetic conductive material which dissipates the SVM field by eddy current induction. In short, the ferrous and conductive material of the electron guns tend to partially dissipate the SVM field and shield the electron beams from interaction therewith.

It is possible to combat adverse effects of shielding and dissipation inherent in a particular SVM coil mounting location by, for example, increasing the SVM drive current, however this may require improved performance current drivers, with increased device dissipation. The number of coil turns may be increased to achieve the desired SVM deflection sensitivity, however, this increase in inductance may result in a reduction in the high frequency performance of the SVM coil to a frequency below that required by the spectral composition of the displayed signal. SVM deflection sensitivity may be improved by positioning the SVM coil as close as possible to the electron beam, since magnetic field strength decreases in proportional the inverse of the spacing distance raised to a power. However, positioning, for example, on the tube neck may result in mechanical mounting problems of the other neck components which may be placed to overlap such an SVM coil position. Thus any SVM coil positioned in contact with a tube surface should have a minimized cross sectional dimension for both the coil and the connections thereto.

SUMMARY OF THE INVENTION

A cathode ray tube display with scanning beam velocity modulation comprises a cathode ray tube with a neck, and gun for generating an electron beam. A deflection yoke is mounted on cathode ray tube for electron beam deflection. A first flexible support having a side for conductor fabrication and a second flexible support having a side for conductor fabrication are superimposed and wrapped to conform to the neck circumference. A first coil pattern is formed as a conductor on the first support and a second coil pattern is formed as a conductor on the second support. A conductive connection couples the first coil pattern and the second coil pattern. A connector couples scanning velocity modulation current to energize the first coil pattern and the second coil pattern for scanning beam velocity modulation.

DETAILED DESCRIPTION

Figure 1A:
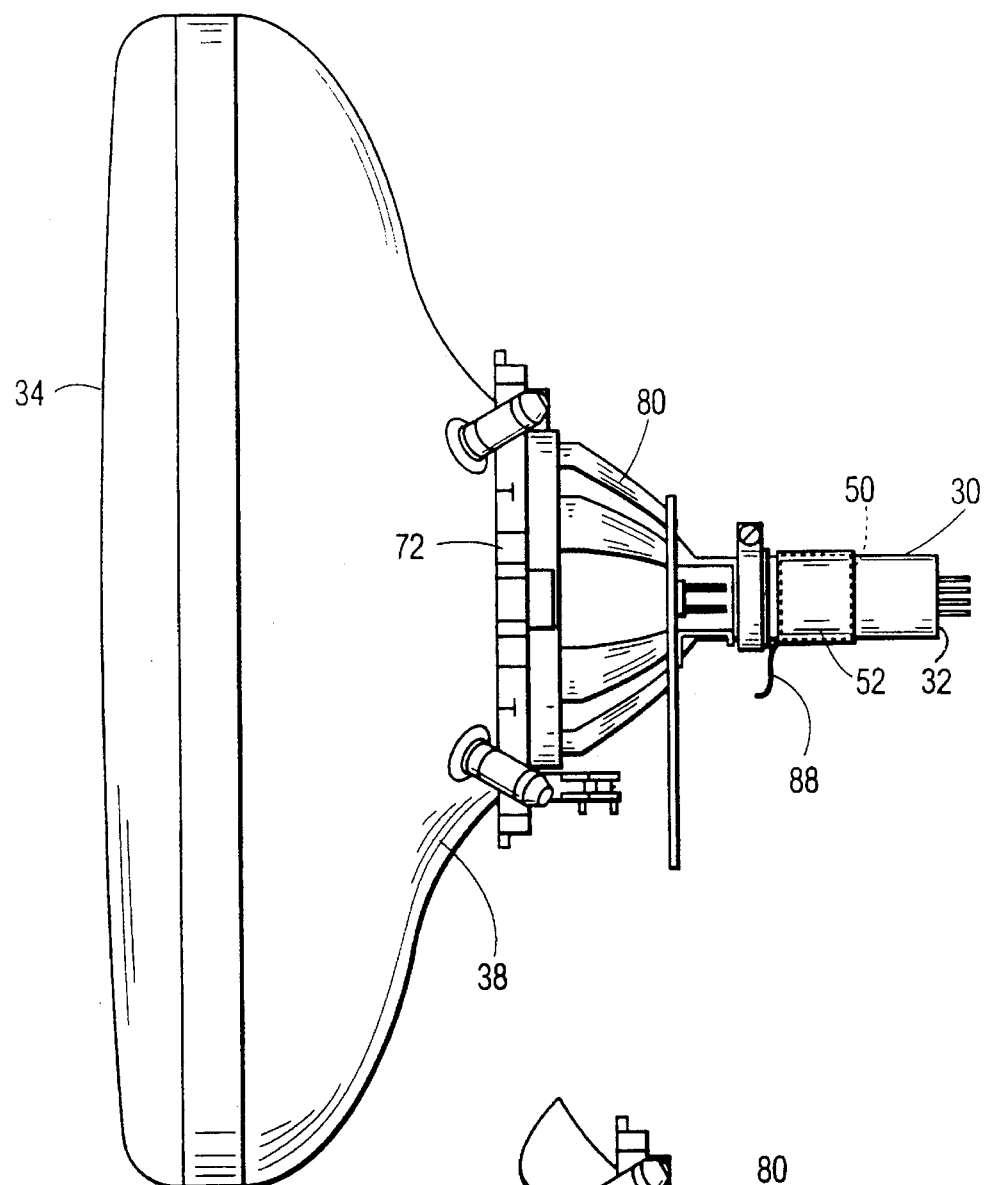
FIG. 1A shows an inventive embodiment of an SVM deflection coil and placement.

With reference to FIG. 1A, a television picture tube is arranged with an electron gun at a rear end 32, which emits a stream of electrons that are accelerated toward a phosphor screen 34 at the opposite or front end. The electrons are moving charges and constitute a current, whereby the electrons are deflected by incident magnetic fields. The electron beam is deflected at a horizontal scanning rate to trace successive lines, and at a vertical scanning rate to cause the successive lines to be vertically spaced from one another on the screen. The scanning defines a raster pattern which is repeated in interleaved fields or in progressive scans of each successive line in turn.

The television picture or cathode ray tube has a funnel shaped or flaring portion 38 between the electron gun rear end 32 and the screen 34. Deflection coils for vertical deflection and horizontal deflection are mounted on a deflection yoke arrangement on a funnel portion 38 of the tube, typically being wound on a plastic yoke form or liner 72. The vertical and horizontal deflection coils are elongated along the funnel in a direction parallel to the electron beam axis 42, and follow along the flaring surface 38 of the tube. The vertical deflection windings are wrapped toroidally on a magnetically permeable core and the saddle shaped horizontal deflection windings are adjacent funnel 38 of the tube.

Figure 1B:
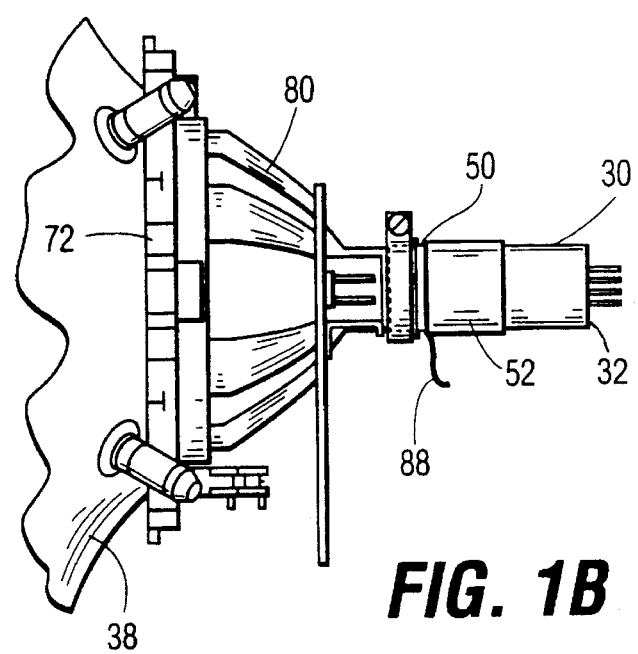
FIG. 1B shows an alternative inventive SVM coil placement.

A flexible printed circuit scan velocity modulation (or SVM) coil 50 is conformed to tube neck 30. In FIG. 1A, scan velocity modulation coil 50 is positioned adjacent the tube neck with a static convergence magnet system 52 overlapping. For example, in a CRT which employs a PI 88 COTY M electron gun assembly, the SVM coil is positioned over the main lens G5–G6 of the assembly. The SVM coil is radially positioned to place the coil conductors which are parallel to the tube Z axis, symmetrically about the tube X axis. The scan velocity modulation coil 50 may alternatively be positioned tube neck 30 adjacent the funnel 38, with the horizontal deflection coils of yoke assembly 80 overlapping, as shown in FIG. 1B. An energizing current is coupled to coil 50, via a conductive connector 88, which results in modulation of the horizontal deflection scanning velocity responsive to displayed video edge transitions. The principal of scanning beam velocity modulation and the derivation of the energizing current is well known and consequently will not be explained.

Figure 2A:
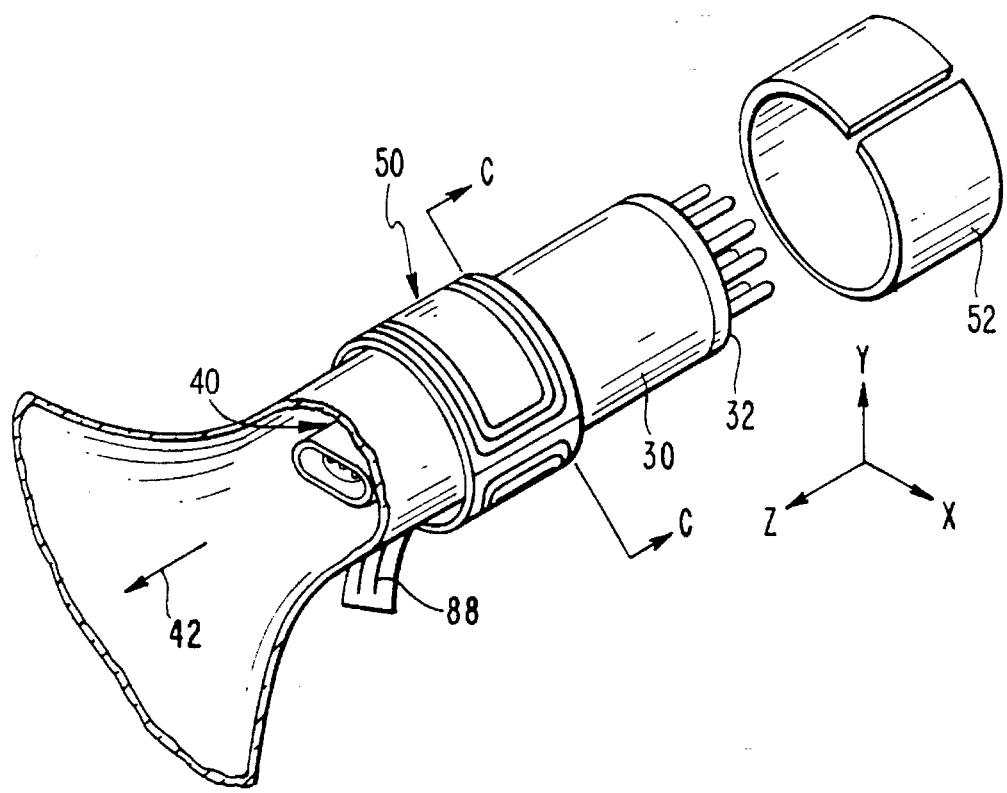
FIG. 2A shows an exploded view of an inventive embodiment.
Figure 2B:
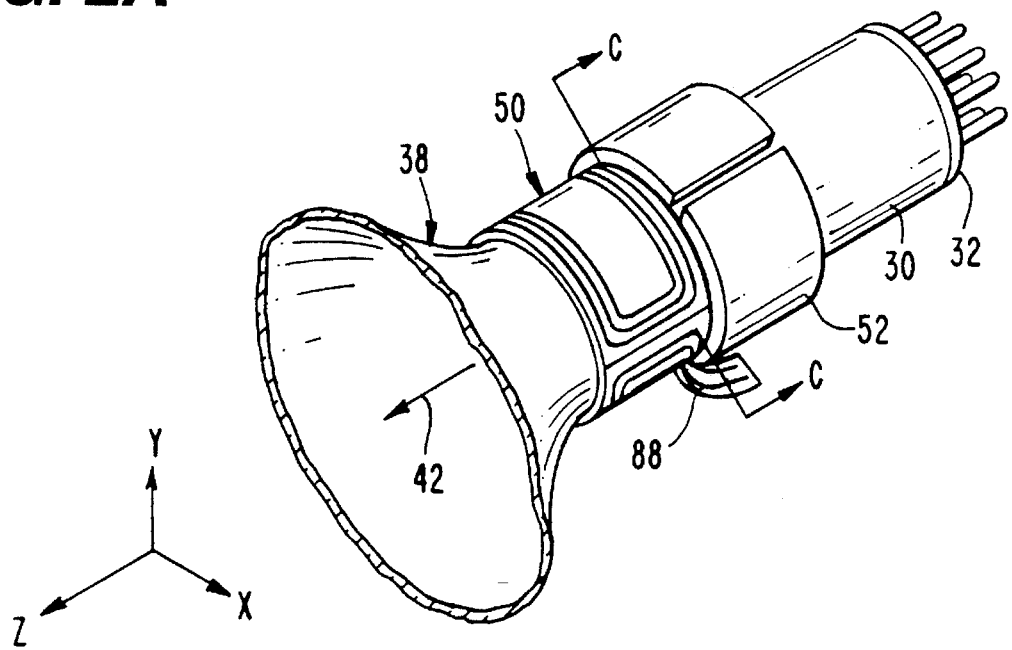
FIG. 2B shows an alternative inventive SVM coil placement.

FIG. 2A shows an exploded partial view of cathode ray tube funnel 38, neck 30 and gun structure 40. An inventive embodiment where flexible scan velocity modulation coil 50 is conformed to the tube neck surface at the same Z axis location as the static convergence magnet 52. The connector conductor surface 88, is positioned on the Y axis and may be oriented to extend towards the screen 34, or socket 32, as required by coupling to an SVM drive amplifier, not shown. Positioning on the +Y or −Y axis provides the correct angular placement of the coils which results in optimum sensitivity. The static convergence magnet 52 is positioned on the tube neck 30 at a Z axis position for achieving static convergence and as such overlaps the SVM coil 50. FIG. 2B shows an alternative neck location of SVM coil 50, positioned adjacent the funnel 38, such as to be under the horizontal deflection coils of yoke 80, which to illustrate SVM coil positioning, have been omitted from FIG. 2B.

Figure 3A:
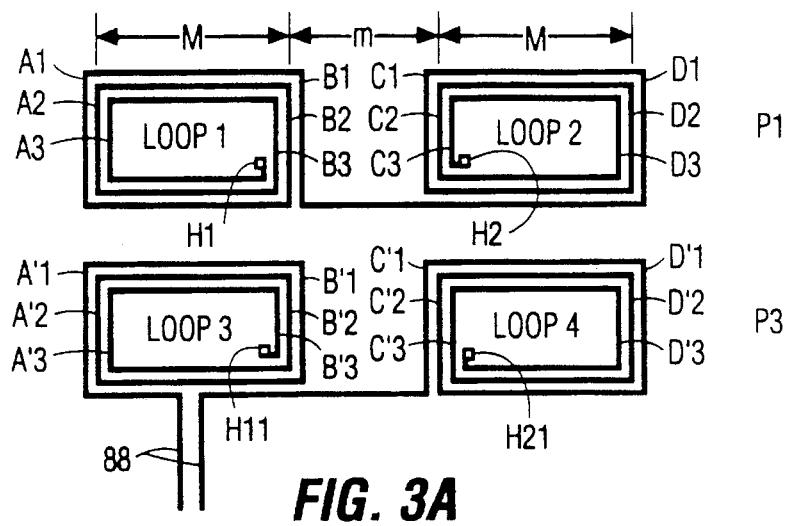
FIG. 3A shows the conductor patterns of an inventive embodiment.

FIG. 3A shows track and coil patterns which are employed to fabricate electrical conductor layers L1 and L3.

There are various techniques for fabricating an electrical conductor having a specific pattern. For example, it is possible to use a printing method where a conductive ink or fluid is deposited on a support layer to produce the required track and coil patterns. Conductive ink or fluid may be deposited by a spraying method similar to that used in an ink jet printing system. A contact printing technique may be used where a conductive ink or fluid depicting the desired track and coil pattern is transferred to a support layer. It is also well known to employ a conductor layer where the conductor is selectively removed with the remaining conductor describing the desired track pattern.

In FIG. 3A the track and coil patterns are shown forming loops about a central conductor free area known as a window. The window areas are shown in FIG. 3A with the designation LOOP 1, 2, 3 and 4. The coil patterns shown for loop 1 and loop 3, and loop 2 and loop 4 are very similar, such that when formed as conductive layers L1 and L3 and positioned on a support layer L2, the conductors of pattern P1 overlay similar ones of pattern P3. For example, in FIG. 3A, conductor A2, the center conductor of loop 1 overlays, that is are substantially coextensive with, conductor A'2 of loop 3, similarly for loop 2, conductor B2 with overlays B'2, and so forth for loops 2 and 4, C2 with C'2 and D2 with D'2.

Figure 3B:
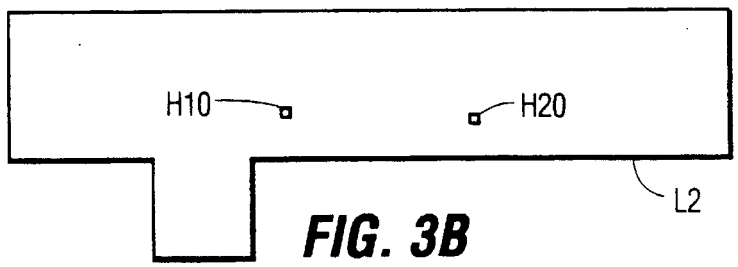
FIG. 3B shows a support layer for conductor fabrication.

FIG. 3B shows the support layer L2. Electrical connection between layer L1 and layer L3 is provided by electrically conductive paths through the support layer L2 at H10 and H20. These conductive paths connect with layer L1 at points H1 and H2, and layer L3 at points H11 and H21. Thus, coil loop 1 is electrically connected in series with coil loop 3, and coil loop 2 is electrically connected in series with coil loop 4. In this inventive assembly, loop conductors of group A, namely A1-3 and A'1-3 are overlaid in a multiple layer configuration, the field generated by six conductors is advantageously located in a circumferential area the same as that occupied by three conductors of a single layer configuration. Thus a required field strength for a given deflection sensitivity may be generated by multiple coil layers positioned with a constrained grouping to yield a narrow chordal angle which minimizes circumferential conductor spread about the optimum 120 degree location for zero third harmonic field generation. Thus, this constrained grouping of conductors advantageous optimizes the fundamental harmonic component of the SVM field and thereby enhances the deflection sensitivity for this SVM coil configuration. This advantageous grouping also applies to the loop conductors of groups B, C, and D, as shown in FIG. 3C.

In FIG. 3A, dimension M is the spacing between the center conductors (suffixed 2 as shown), and is selected to be equal to approximately one third of the tube neck circumference. This approximate dimension must take into account the thickness of the conductor layer L1 or L3, plus the thickness of the support layer L2. In this example of a coil pattern, the support layer L2 is flexible and is formed into a cylinder of diameter equal to that of the tube neck. When conformed with the tube surface this selection of dimension M results, in the center conductors A2 and B2, at each side of the window of loop 1, subtending an angle of 120° about the tube Z axis, as depicted in FIG. 3C. The spacing between the loops, m, is chosen to position the loops symmetrically about the tube Z axis such that conductors A2 and D2 are spaced circumferentially to be the same as conductors B2 and C2. Thus, with the track pattern shown in FIG. 3A, and the radial positioning shown in FIG. 3C, a magnetic dipole field is established on the tube Y axis, perpendicular to the both the X and Z axes. This Y axis field results in horizontal or X axis deflection of the Z axis electron beam. The selection of 120° conductor spacing results in zero third harmonic field generation by the coil. Setting the third harmonic of the SVM coil field to zero, eliminates the possibility of SVM action producing deflection differentials between the three electron beams, i.e. SVM operation will not result in miscolored edges.

Figure 3C:
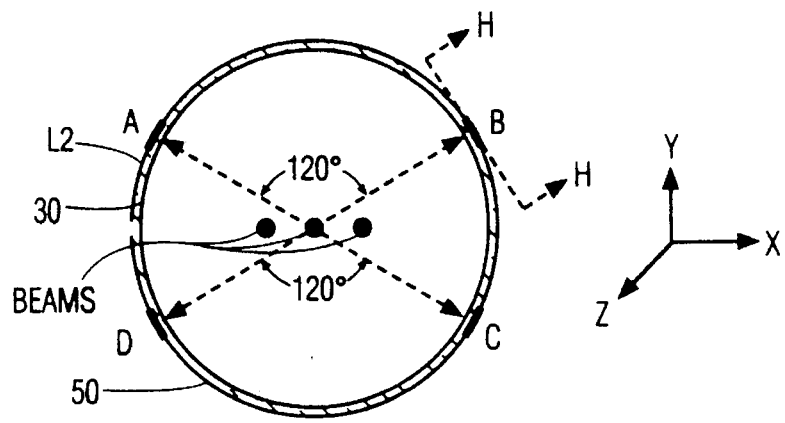
FIG. 3C is a cross section of the tube neck of FIG. 2 at C/C showing circumferential placement of conductor patterns.

FIG. 3C is a radial section through the tube neck, and for simplicity of illustration the gun structures within the neck have been omitted and the thickness of the flexible coil system has been exaggerated to provide additional clarity. Undeflected electron beams are shown on the X axis of the tube symmetrically positioned about the tube Z axis. The section is positioned such as to cut through coil loop conductor groups A, B, C, and D. When the support is conformed to the tube neck, and the center conductors (suffix 2) are spaced as described earlier. The suffix 2 conductors A2 and A'2, and B2 and B'2 subtend an angle of 120° about the Z axis as shown in FIG. 3C. Similarly for conductors C2 and C'2, and D2 and D'2 which also subtend an angle of 120° about the Z axis. The conformed support is positioned on the tube neck such that the suffix 2 conductors are symmetrically positioned about the +Y and −Y axis. Furthermore, as a consequence of the dimensions and placement of the loops on the support L2, the suffix 2 conductors will be symmetrically positioned about the +X and −X axis. The physical placement of conductors 88 in the loop pattern is used to provide a rotational reference for angular placement of the conformed coils on the tube neck, this results in the desired symmetrical placement of the various conductor groups about the various tube axes.

Figure 3D:
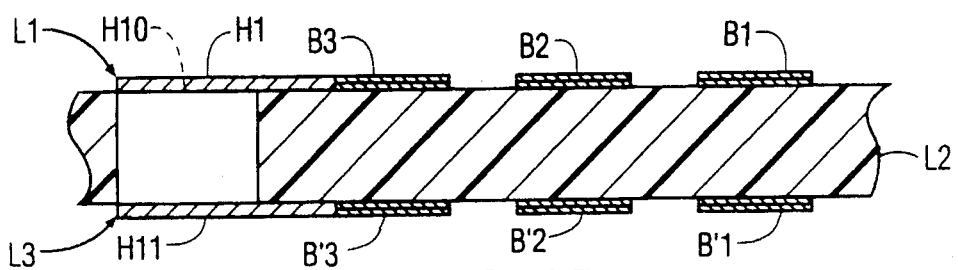
FIG. 3D is a magnified view at section line H/H of FIG. 3C.

FIG. 3D is a magnified sectional view of FIG. 3C at the section line H/H. For simplicity of illustration, this view ignores the conformance of the flexible support L2 and coil conductor layers L1, L3 to the tube neck circumference. This magnified cross section which shows the registered alignment of conductors B1-3 and B'1-3. Electrical connection between layer L1 and layer L3 is provided by an electrically conductive path through the support layer L2 which connects to layer 1 at pad H1, and layer 2 at pad H11. Deflection sensitivity of this inventive flexible SVM coil system is advantageously enhanced by wrapping the flexible SVM coil system around the circumference of the tube neck. Thus the coil system is in contact with the glass and as close as possible to the electron beams.

Advantageously, deflection sensitivity is further enhanced by the 120° angular placement of the Z axis center conductors A2-A'2, B2-B'2, C2-C'2, D2-D'2. By locating the conductors at 120°, the field produced by the coil system has zero third harmonic component. With zero third harmonic field, more useful SVM deflection of beams results, since SVM drive current does not generate third order fields which would produce unwanted differential deflection of the outer electron beams relative to the center.

Deflection sensitivity is further enhanced by the positioning of the coil layers such that the Z axis conductors, A1-3 and A'1-3, B1-3 and B'1-3, C1-3 and C'1-3, D1-3 and D'1-3 overlap. FIG. 3D shows the registered overlapping coextensive alignment of conductors B1-3 and B'1-3. This feature constrains the circumferential field to approximately that of a single layer. Thus, the third order field remains at zero but since the coil loops are connected in series the inductance is increased in proportion to the number of turns squared.

Figure 4A:
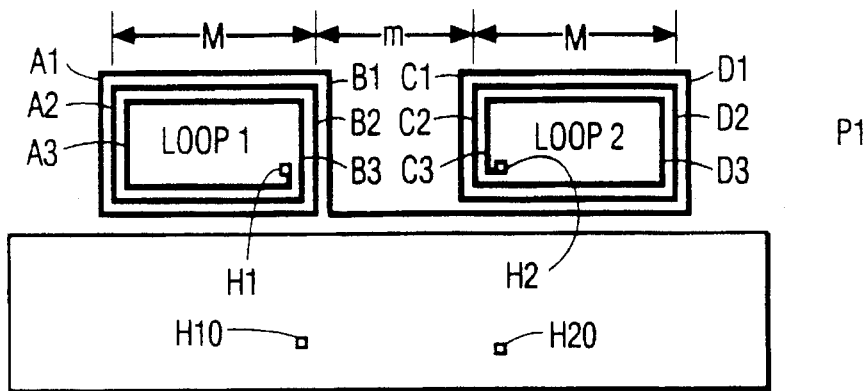
FIG. 4A shows a first conductor pattern and support layer of an alternative inventive embodiment.
Figure 4B:
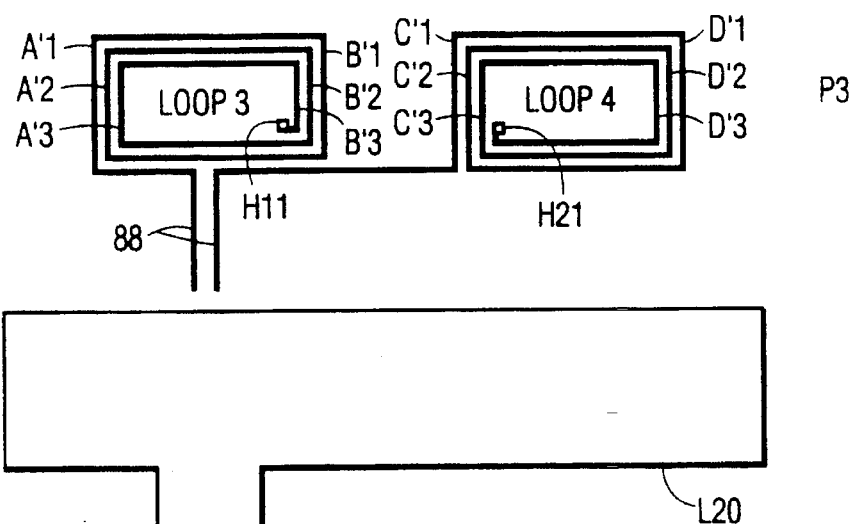
FIG. 4B shows a second conductor pattern and support layer of an alternative inventive embodiment.
Figure 4C:
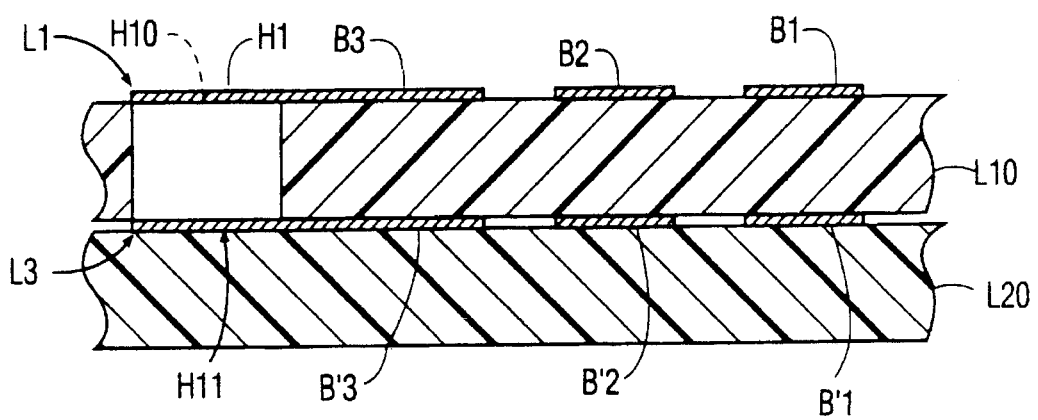
FIG. 4C shows a cross section view positioned as FIG. 3D.

Multiple layer coil systems may be constructed to achieve a desired inductance value without compromising the desirable requirement for zero third harmonic field generation. FIG. 4A shows a coil pattern with a window area which is formed as a conductor as a first layer of multiple layer coil system. The dimensional parameters are as described earlier. The coil pattern P1 of FIG. 4A is formed as conductive layer 1 on support layer L10. Conductive connecting holes H10 and H20 extend through the support layer L10. FIG. 4B shows a coil pattern P3 enclosing window areas within loops 3 and 4 and forming a further layer of multiple layer coil system, where energizing current is coupled to coil loops 3 and 4 by conductors 88. Coil pattern P3 is formed as a conductive layer L3 on support layer L20. Support layers L10 and L20 are superimposed to be substantially coextensive such that H10 and H20 are aligned with pad contact areas H11 and H21. Following alignment the conductive holes and contact pads are conductively joined, the support layers may also be attached one to the other. The assembled multi layer coil is shown in magnified cross section in FIG. 4C, (section located as described for FIG. 3C). FIG. 4C shows the alignment of group B conductors, conductive holes and pads, which are superimposed such that conductor B1 overlays conductor B'1 etc.

The inventive SVM coil assembly may be fabricated by many methods however, photo lithographic techniques employing photo sensitive conductor layers on a flexible support layer offer savings in material costs and considerable savings in manufacturing tooling and assembly costs. For example, wound SVM coils require winding machines and coil support structures, and additionally the wire must be terminated to provide connection. Other printed circuit coils exist having wire connections to the coils, these cross each coil loop to a central feed point. However, such wire connections are undesirable since they increase the cross sectional dimension of the coil, and represent a further operational manufacturing step and additional cost.

The inventive SVM coil system was fabricated on a flexible support layer with a coil pattern layer formed on each side. The performance SVM coil system was evaluated under the following conditions:

Tube type 27 V.

Electron gun PI 88, COTY M.

EHT 30 KV.

Tube neck diameter 29 mm

Yoke pull back 3 mm, (back of yoke 87 mm from base).

SVM coil front edge 84 mm from base.

The SVM coil system has the following specifications:

conductor width: 0.8 mm conductor spacing: 0.5 mm conductor thickness: 8–10 μM support thickness: 0.125 mm turns per loop 3, two layers inductance (at 1 KHz): 3.8 μH resistance: 1.78 Ω

Deflection sensitivity:

DC deflection sensitivity in center: 2.75 mm/A

AC drive signal, 1 Amp pulse, 100 ns rise and fall times

AC deflection sensitivity in center: 0.73 mm/A.

What is claimed is:

1. A color cathode ray tube display with scanning beam velocity modulation, comprising:

a color cathode ray tube and guns generating a plurality of electron beams along a z axis;

a deflection yoke mounted on a neck of said cathode ray tube and generating a main deflection field, said plurality of electron beams being deflected by said field with a certain level of differential deflection;

a flexible support having first and second sides;

first and second conductor coil patterns respectively disposed adjacent opposite sides of said flexible support, each of said patterns forming two generally rectangular loops about respective conductor free window areas;

side conductors of said generally rectangular loops of said first and second conductor coil patterns oriented generally parallel to said z axis in a constrained grouping within a narrow chordal angle, said side conductors subtending a predetermined angle symmetrically positioned about said Y axis on said neck when said flexible support is conformed to said neck;

a conductive connection through said flexible support for coupling scanning velocity modulating current between said conductor coil patterns in a series arrangement; and, said constrained grouping of said side conductors and said series arrangement of said first and second conductive coil patterns generating an auxiliary deflecting field producing substantially more deflection sensitivity than either one of said conductive coil patterns individually without substantially increasing said certain level of said differential deflection.

2. The apparatus of claim 1, wherein said first coil pattern conductor and said second coil pattern conductor further comprise conductors formed in a plurality of concentric loops.

3. The cathode ray tube display of claim 1, wherein said first and second conductor coil patterns are aligned to substantially superimpose said side conductors to form said narrow chordal angle when conformed to said tube neck.

4. The apparatus of claim 1, wherein said flexible layer is conformed and positioned adjacent said tube neck under a static electron beam convergence device.

5. The apparatus of claim 1, wherein said flexible layer is conformed and positioned adjacent said tube neck under a deflection yoke.

6. The apparatus of claim 1, wherein said predetermined angle is symmetrically disposed about said x axis and subtends substantially 120 degrees about said Z axis.

* * * * *